United States Patent [19]

Nagata et al.

[11] Patent Number: 5,162,644
[45] Date of Patent: Nov. 10, 1992

[54] CONTACT TYPE IMAGE SENSOR HAVING PHOTOELECTRIC CONVERSION ELEMENTS TO REDUCE SIGNAL VARIATION CAUSED BY LUMINOUS INTENSITY VARIATION OF LIGHT SOURCE

[75] Inventors: Tatsuya Nagata, Ibaraki; Michihiro Watanabe, Tsuchiura; Takehiko Yamada, Chigasaki; Shigetoshi Hiratsuka, Yokohama, all of Japan

[73] Assignee: Hitachi, Ltd., Tokyo, Japan

[21] Appl. No.: 559,144

[22] Filed: Jul. 30, 1990

Related U.S. Application Data

[60] Continuation-in-part of Ser. No. 517,810, May 2, 1990, Pat. No. 4,977,313, which is a division of Ser. No. 321,881, Mar. 10, 1989, Pat. No. 4,940,888.

[30] Foreign Application Priority Data

Sep. 8, 1989 [JP] Japan .................................. 1-231610

[51] Int. Cl.⁵ ............................................. H01J 40/14
[52] U.S. Cl. ................................ 250/208.1; 250/214 B; 358/482
[58] Field of Search .................. 250/208.1, 211, 214 B; 358/482, 471; 357/30 L

[56] References Cited

U.S. PATENT DOCUMENTS

| | | | |
|---|---|---|---|
| 4,874,957 | 10/1989 | Sasaki et al. | 250/208.1 |
| 4,894,700 | 1/1990 | Nobue et al. | 357/30 L |
| 4,908,718 | 3/1990 | Shimada | 250/208.1 |
| 4,931,661 | 6/1990 | Fukaya et al. | 250/208.1 |
| 4,940,888 | 7/1990 | Nagata et al. | 250/208.1 |
| 4,972,243 | 11/1990 | Sugawa et al. | 357/30 L |
| 4,982,079 | 1/1991 | Yagyu | 250/208.1 |
| 5,015,837 | 5/1991 | Hiroi et al. | 250/208.1 |

FOREIGN PATENT DOCUMENTS

| | | |
|---|---|---|
| 58-68965(A) | 4/1983 | Japan . |
| 60-244062(A) | 12/1985 | Japan . |
| 61-41268(A) | 2/1986 | Japan . |
| 61-84862(A) | 4/1986 | Japan . |
| 61-161757(A) | 7/1986 | Japan . |

OTHER PUBLICATIONS

*Nikkei Electronics* vol. 207, No. 434, Nov. 16, 1987, pp. 207-221.

Primary Examiner—David C. Nelms
Assistant Examiner—Michael Messinger
Attorney, Agent, or Firm—Antonelli, Terry, Stout & Kraus

[57] ABSTRACT

A contact type image sensor comprises a transparent substrate, photoelectric conversion elements disposed on the substrate, and an opaque film disposed selectively over the first photoelectric conversion elements. The first photoelectric conversion element over which the opaque film is disposed indicates a reference quantity of received light. The second photoelectric conversion element connected with the first photoelectric conversion element in adjacent relationship and having no opaque film disposed thereover indicates a quantity of light from an original document. A signal free from a varying luminance of the light source is obtained from the junction point of the first and second photoelectric conversion elements.

50 Claims, 10 Drawing Sheets

READ SENSOR

IMAGE SENSOR

DIVISION 660

CONTACT TYPE IMAGE SENSOR HAVING PHOTOELECTRIC CONVERSION ELEMENTS TO REDUCE SIGNAL VARIATION CAUSED BY LUMINOUS INTENSITY VARIATION OF LIGHT SOURCE

CROSS-REFERENCES TO OTHER APPLICATIONS

This application is a continuation-in-part of a patent application Ser. No. 07/517,810 filed May 2, 1990, now U.S. Pat. No. 4,977,313, which is a divisional application of a patent application No. 321,881, now U.S. Pat. No. 4,940,888, entitled "DIRECT-CONTACT-TYPE IMAGE SENSOR AND IMAGE SENSOR ASSEMBLY", filed by Tatsuya NAGATA et al. on Mar. 10, 1989, and assigned to the same assignee of this application, the disclosure of the divisional application is hereby incorporated by reference.

BACKGROUND OF THE INVENTION

The present invention relates to a sensor for reading original documents and used in facsimile devices, word processors, etc.

As disclosed in Japanese Patent Publication JP-A 60-244062, a conventional image sensor includes a first photoconductive cell (element) formed at a position where light for reading is received, and a second photoconductive cell (element) formed at a position where no light is received, both elements being connected in series, across which a voltage is applied in common and the potential at the junction point of the elements being extracted to the outside.

Another conventional image sensor, as described in Nikkei Electronics, 434 (1987), Vol. 207, pp. 207–221, includes a photoconductive element, a transfer switch and a reset switch each including a thin film transistor made of hydrogenated amorphous silicon (a-Si: H) or amorphous silicon (hereinafter referred to as a-Si), signal matrix leads and gate leads. So-called contact type reading is performed by placing an original document in contact with a transparent substrate over which photoconductive elements are formed, illumining the document through the transparent substrate with a light source disposed on the opposite side of the substrate from its surface over which the photoconductive elements are formed, and directing the reflected light to the photoconductive elements for photoelectric conversion.

The photoconductive elements receive only the light reflected by the original document and the produced photocurrent is stored in the storage capacitor for a predetermined time. A transfer signal is delivered to the gate lead to transfer signal electric charges produced by 32 photoconductive elements per block to the capacitor for 32 signal matrix leads using the switching operations of the a-Si thin-film transistors and the external circuit reads the signal voltages sequentially. Since transfer and resetting of signal electric charges per block are performed by supplying a signal externally to the gate leads, the gate leads used are the same in number as the blocks. The elements in a block are the same in number as the signal matrix leads.

The above two conventional techniques allow for variations in the illuminance of the light source illumining the document, which variations directly bring about corresponding undesirable variations in the output signal. Changes in the sensitivity due to temperature and aging and/or variations in the pattern accuracy lead directly to variations in the signal.

The latter conventional technique allows for the fact that because a photocurrent flowing through the photoelectric conversion element is all stored in a storage capacitance connected with a thin film transistor having a small conductance, it takes long time for transfer of the electric charges and hence high speed reading is difficult.

In the latter conventional technique, matrix driving for reading is all performed by an external circuit which drives a gate line and a matrix line, increasing the number of leads and disadvantageous for miniaturization and the external circuit is undesirably large-scaled.

Also, in the latter conventional technique, the elements of one block are the same in number as the signal matrix leads, so that a data transmission time and a reset time are required in block switching until the next block is read. Thus, the conventional technique does not allow for intervention of a rest time between signals for the adjacent blocks and signal reading is complicated.

SUMMARY OF THE INVENTION

It is an object of the present invention to reduce variations in the read signals due to variations in the brightness of the light source.

It is another object of the present invention to provide a miniaturized inexpensive image sensor which is driven at high speed by a thin film transistor and has a small-scaled external circuit.

In order to achieve the above objects, the present invention provides over a transparent substrate a reference element which converts direct light, from a light source which illumines an original document, to an electrical signal, and a read element which converts light reflected by the document to an electrical signal.

In this case, preferably, the read and reference elements are connected in series and a voltage is applied across the series connected elements, and a divided voltage at the connected point is extracted to be used as a read signal. Also, preferably, a capacitor for transfer of the read voltage is provided in parallel with either the read or reference element. Alternatively, a capacitor may be provided in parallel with each of the read and reference elements. The read and reference elements may be produced efficiently in the same process.

Preferably, the ratio of the photocurrent flowing through the reference element to the photocurrent flowing through the read element when a white original document is read is 0.1–100. A dividing circuit is preferably used to linearize the output signal.

In order to achieve the another object, the present invention sequentially selecting switches using shift registers, buffers connected to the outputs of the shift registers, block switches and stabilizing switches of amorphous silicon thin-film transistors the stabilizing switches being connected to the corresponding buffers, and a plurality of dividing matrix lines; and transfers and reads a quantity of electric charges from read elements.

Similarly, in order to achieve the another object, the present invention provides an image sensor comprising: a shift register of a thin film transistor; a plurality of buffers connected to outputs of the shift register; a plurality of block switches and stabilizing switches connected to the corresponding buffers; a plurality of dividing matrix lines; whereby read switches are selected sequentially for purposes of reading; and a plurality of blocks each including elements less in number than the dividing matrix lines.

Preferably, a transparent laminate such as a transparent electrically conductive resin film is provided over the photoelectric conversion elements. That area portion of the surface of the transparent laminate facing the photoconductive elements and substantially covering the photoconductive elements and their vicinities preferably constitute a surface which scatters the incident light and/or a slightly rough surface (hereinafter referred to as a satin finish conductive film or a satin finish matted surface).

If this transparent laminate is placed without using an adhesive, there are no problems with static capacitance.

A read assembly of the present invention ensures a path for incident light on the back of a transparent portion of each image sensor. A platen roller abuts on the outer surface of the film or transparent laminate in the vicinity of the photoelectric conversion elements. Preferably, a light source is provided in a base on which the substrate over which the elements are provided is attached to ensure a light path.

A facsimile device according to the present invention is characterized by an image sensor assembly and a printing unit comprising a thermal head and a recording paper roller, accommodated in a housing.

Optimal rather rough processing of a surface is satin finish matte processing. Preferably, a structure is used which is achieved by processing one face of the photoconductive film so as to be a satin finish matted one and disposing the film such that the stain-finished surface faces the sensor. Alternatively, a structure may be used which is achieved by processing one face of a transparent film so as to be a satin finish matted one, and disposing the film such that the satin finish matted surface faces the sensor and disposing a conductive transparent film on the former film.

The conductive film may be disposed or bonded directly or indirectly on or to the appropriate surface of the sensor substrate.

The satin finished surface is a rather rough surface to change and randomly scatter the path of the reflected and transmitting light. Preferably, the satin finished surface is about 0.2–10 $\mu$m high and deep in roughness to thereby provide a transmittivity of 70% or more for light including scattered light.

If a structure is employed in which a conductive film is provided on the sensor substrate such that focusing and concave mirror reflection of light by the film surface is prevented, the above intended objects are achieved.

Preferably, the substrate over which the sensor is provided is made of an insulator. The vicinities of that portion of the substrate over which the elements are provided are the region where the elements are provided and the peripheral region around the periphery of the former region. The peripheral region corresponds to a region which defines a space which, for example, the conductive film and the substrate over which the sensors are provided are caused to produce necessarily by the pressure of a platen roller or by the thickness of the sensor element.

The meanings of transmission of light and transparency change depending on a light source used. The light used is in a region of wavelengths sensed by the sensor element. For an a-Si (amorphous silicon) sensor, the light used points to all the visible rays of light.

The base itself accommodating the light source may also act as a plate over which the sensor is provided.

The reference element which converts direct light from the light source which illuminates the original document to an electrical signal provides an output proportional to the brightness of the light source. The read element which converts the light reflected by the original document to an electrical signal provides a photoelectric conversion output proportional to the luminance and reflectance of the document. Therefore, the photoelectric conversion output of the read element comprises an output corresponding to the reflectance of the document to be read properly and noise components due to variations in the illuminance. The reference element provides an output proportional to the brightness of the light source, which is proportional to the illuminance of the document, so that the output of the read element is corrected with the output of the reference element such that only an output corresponding to the reflectance of the document is extracted.

The read and reference elements are connected in series and a voltage is applied across the series connected circuit of the read and reference elements and then an output voltage at the connected point defined by the resistance ratio of the read and reference elements is output. The resistance of both the elements is inversely proportional to their conductance, which is proportional to the intensity of light incident on the elements. Therefore, the output is inversely proportional to the ratio in intensity of light incident on both the elements. The output voltage is determined by the ratio in conductance of the read to reference element, so that variations in the output due to variations in the brightness of the light source are eliminated.

If the read and reference elements are connected in series and a voltage is applied across the series connected circuit and a capacitor for transfer of a read voltage is provided in parallel with the read or reference element, a read voltage corresponding to the reflectance of the document appears at the junction point of both the elements. Therefore, the read voltage transfer capacitor can be used to store signal electric charges proportional to the read voltage. The magnitude of the read voltage transfer capacitor does not depend on the magnitude of a photocurrent flowing through each of the read and reference elements, but can be changed to any value by changing parallel areas of leads of the capacitor. Thus, the value of the capacitance can be selected in accordance with the ability of the circuit to read the signal.

While the read and reference elements are different in light incident direction, they are made of a semiconductor film to perform a photoelectric conversion. Thus, if they are manufactured in the same process, variations in the characteristics of the elements are reduced, the number of manufacturing steps is also reduced and hence an inexpensive image sensor is provided.

In a design case, the value of the photocurrent flowing through the reference element greatly differs from the maximum value of the photocurrent flowing through the read element, namely, the photocurrent value obtained when a white original document having a reflectance of about 0.8 is read. If variations in the brightness of the light source are corrected by such a reference element as is mentioned above, the resulting S/N ratio is lowered. Therefore, an error to be corrected is reduced by setting the photocurrent ratio at a value of 0.1 to 100. If the reference and read elements are connected in series and a part of the voltage signal applied across the connected elements is used as a read voltage, a change in the voltage produced when the photocurrent in the read element changes is reduced if the currents in both the elements greatly differ, and a high S/N ratio cannot be obtained. In this case, a satisfactory output is obtained by setting the maximum of the photocurrent flowing through the reference element at a value of 0.1 to 100 and preferably 0.5-5 of the photocurrent flowing through the reference element.

As mentioned above, in the structure where the read and reference elements are connected in series and a voltage output is used as a read voltage, the read voltage includes a division at the ratio in resistance of the read to reference element. In reading an original document, it is preferable to provide a read output signal proportional to the reflectance or intensity of the incident light on the read element. The read voltage determined by the ratio in resistance value is inversely proportional to the photoconductivity or the intensity of the incident light. The inverse of the output voltage is calculated by a dividing circuit to provide an output proportional to the intensity of the incident light.

Since the drift mobility of electrons in amorphous silicon is low, for example, 0.2-1.0 cm$^2$/V·S, an amorphous silicon thin-film transistor does not operate at high speed like a transistor of crystal silicon. However, a transistor circuit can be designed which drives the image sensor at a rate of 500 kHz. If a data transfer clock and a block selection starting signal are input to a shift resistor comprising amorphous silicon thin film transistors, the shift resistor shifts the block selection signal synchronously with the transfer clock. The outputs from the respective stages of the shift resistor are connected via buffers with corresponding block switches and stabilizing switches. When the output of the shift resistor is 1 (logically high), the corresponding block switch is conductive while the stabilizing switch becomes conductive conversely when the output of the shift resistor is 0 (logically low). A block switch connects the corresponding control line of a read switch and a dividing matrix line while the appropriate stabilizing switch has a function of connecting the control line of the read switch with an off-side power source line. A block switch and a stabilizing switch are connected with a read switch disposed for a corresponding read element. A plurality of read elements constitute one block. When a block selection signal is shifted in the shift register, the associated block switch is rendered conductive through a buffer. When the plurality of dividing matrix leads are rendered high sequentially, the read switches are rendered conductive sequentially, the electric charges indicative of signals obtained as the result of photoelectric conversion by the read elements are sequentially transferred. When a block is not selected, and the corresponding block switch is off, the associated stabilizing switch is conductive such that the control line of the read switch is connected with the off-side power source line. If signals are applied sequentially to the dividing matrix in order to read signals of other blocks, the nonselected block suffers from entrance of signals on the dividing matrix lines due to the presence of parasitic capacitance of the block switch in an off state and thus the potential of the control line of the read switch fluctuates. The stabilizing switch is conductive and acts such that the changing potential becomes the potential on the off side. Thus, the read switch acts erroneously to prevent electric charges indicative of the signal in the non-selected block from being read.

If the number of photoelectric conversion elements of each block is less than the number of dividing matrix leads in the image sensor comprising the shift registers, buffers, block switches, stabilizing switches, each made of an amorphous silicon thin film transistor, the dividing matrix leads, and a photoelectric conversion elements, the output of the shift register can shift from a particular stage to the next stage to simultaneously select a particular block already selected and the next block for an interval of time, which can be tolerated. Let the number of photoelectric conversion elements of each block be N and let the number of dividing matrix leads be N+n. Assume that a particular block is selected and a signal is applied sequentially to the dividing matrix leads. After the photoelectric conversion elements are read sequentially up to the N-th element is then read, the next block and a particular block are selected simultaneously, and the elements are read successively and up to the (N+n)th element. In this case, since only one element is connected with the same dividing matrix line in the two selected blocks, the two blocks are not read simultaneously. Therefore, the time required for reading n elements may be a half of the time for block selection to thereby provide a time leeway in block switching. Therefore, signal reading is achieved even if no rest interval is especially provided in block switching.

An electric field due to static electricity produced when an original document is traveled is screened by performing contact reading with a satin finish transparent conductive film disposed on the sensor, so that no noise due to fluctuations of an electric field is induced in the leads. Thus, the thin film transistors do not malfunction and a small read signal are prevented from fluctuating.

The satin finish transparent conductive film is an elastically deformable transparent film having a conductivity corresponding to a sheet resistance of 100 kΩ/□ or less. The surface of the film coming into contact with the sensor is rough and thus light is scattered by the surface. The film is disposed such that the satin finish surface faces the image sensor substrate. Thus, since light from the light source which illumines the document from the back of the substrate is scattered by the satin finish film surface, the read output is prevented from becoming abnormal due to collection of light by the reflection when the film is deformed concave by pressing the document against the film in contacting relationship.

By providing the conductive transparent film over the substrate, a contact type image sensor is obtained which is easy to produce and has stabilized read performance. The conductive transparent film is easily deformed by a load and difficult to break. Since the conductive transparent film acts as a shield against electric waves and electrostatic induction, noise is prevented from occurring in the output signal of the contact type image sensor. It also acts as a spacer having a function of transmitting light therethrough between the original document and the sensor and further as a wear-resistance protective film. Due to those effects, the contact type image sensor is easily assembled and has a stabilized read performance similar to that of the conventional sensor.

The use of a polymer film as a conductive film serves to reduce a mirror face portion to thereby improve scattering effect, which, in turn, improves the function of the read sensor.

By providing above the photoelectric conversion element a conductive film processed so as to have a satin finish matted surface such that such surface faces the conversion element, the light irradiated from back is scattered by, transmitted through and reflected by the satin finish matted surface. By pressing an original document against the matted surface, the conductive film having the satin finish matted surface is deformed and changes the direction of reflection. Mirror face reflection of the illuminating light by a smooth film surface would be entered into the photoelectric conversion element and added to the light from the document so that the "white" output increases abnormally while the occurrence of such reflected light is prevented on the satin finish surface, since the reflected light is scattered. Therefore, in addition to the above action, such an abnormal white light output due to deformation of the film surface is eliminated and a stabilized read performance is ensured.

Separation of the respective actions of the conductive film and the satin finish matted film by separating the films is considered. The reflected light is scattered by the film having one satin finish matted surface disposed such that this surface faces the substrate surface on which the photoelectric conversion element is mounted, and the occurrence of an abnormal output due to the illuminating light coming from the back of the sensor substrate being otherwise reflected by mirror face and entered into the photoelectric conversion element is prevented. When the conductive transparent film is bonded to the sensor substrate, a deformation of the film which would otherwise occur when an original document is pressed against the image sensor is suppressed. Thus, entrance of the illuminating light reflected by the sensor substrate side surface of the film into the sensor element is suppressed and an output abnormality is difficult to occur. When the sensor substrate and the conductive transparent film are bonded, no air layer of a low refractive index is provided between the sensor substrate and the conductive transparent film. Thus, the reflectance of the sensor substrate side surface of the conductive film is reduced and an output abnormality is more unlikely to occur.

By disposing the conductive transparent film over the sensor substrate to prevent reflection by the conductive transparent film surface, reflected light other than that from the original document is prevented from entering the sensor element and hence a stabilized sensor output is obtained.

The use of a glass plate instead of the transparent film falls within the scope of the present invention of course.

DESCRIPTION OF THE PREFERRED EMBODIMENTS

Embodiments of the present invention will be described hereinafter with reference to the drawings.

Figure 1:
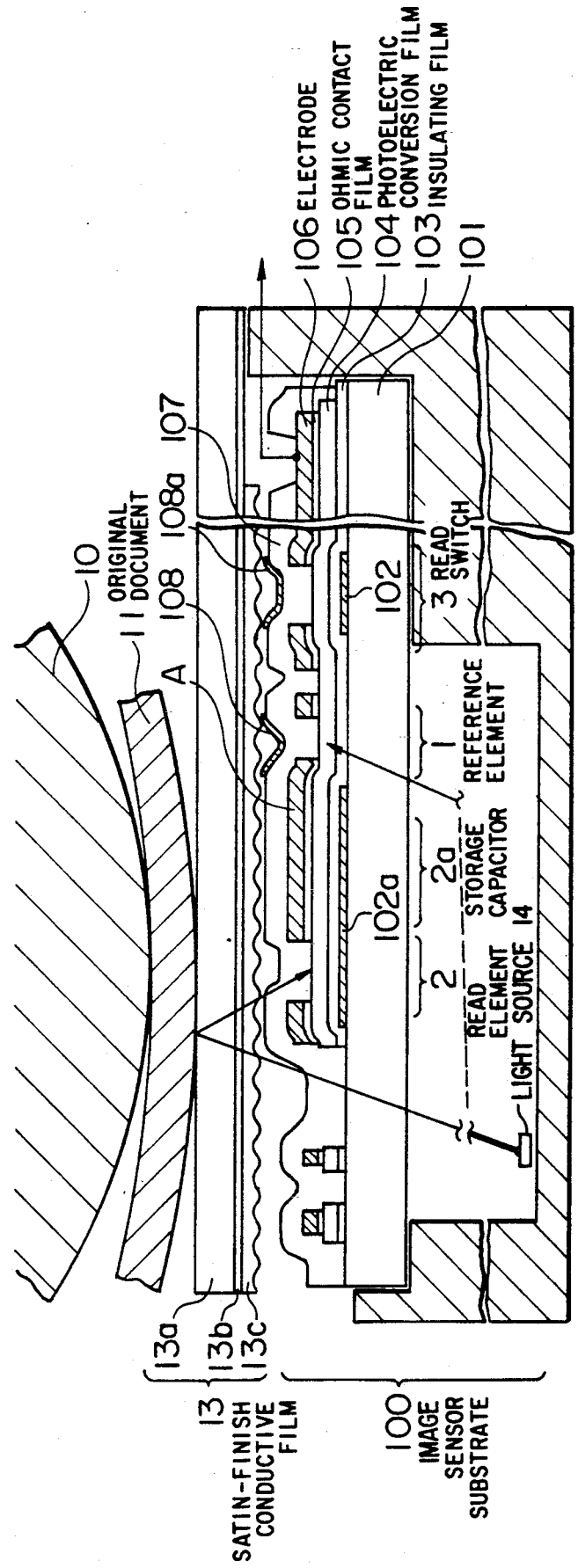
FIG. 1 is a cross sectional view of the essential portion of a contact type image sensor according to an embodiment of the present invention.

FIG. 1 is a cross sectional view of a contact type image sensor according to one embodiment of the present invention. In the entire structure, a satin finish matted conductive film 13 is disposed on an image sensor substrate assembly 100. A platen roller 10 presses an original document 11 against the substrate assembly 100. A light source 14 is disposed on the opposite side of a substrate 101 from the document 11. Illumining light from the light source 14 illumines the document 11, to be read, through a transparent portion of the substrate 101 and the film 13. The light reflected randomly by the document enters a read element 2 formed on the substrate 100 with an intensity corresponding to the reflection density influenced by the presence of characters on the surface of the document 11 and then is converted to an electrical signal.

In the reading of an original document by a G3 standard facsimile device, read elements 2 are disposed in line with a density of 8 elements/1 mm. The number of elements for an A4-sized document is about 1,728 while about 2048 elements are disposed in a read sensor for a B4-sized document. The different widths of documents to be read are 216 mm and 256 mm, respectively. A contact image sensor which reads the actual size of an original document is required to have the same size as the document. The light source 14 is required to illumine the entire size of the document. The central illuminance of a fluorescent lamp used as the light source differs from those of ends of the lamp. In the case of a light source including an array of a multiplicity of light emitting diodes, illuminance varies along the length of the array due to varying characteristics of the diodes.

Since the intensity of the light reflected by the document 11 is proportional to the luminance of the document surface, a changing illuminance of the document 11 illumined by the light source 14 leads correspondingly to a changing output, which is reflected to as shading, of the image sensor. If the output of the sensor is black-white binarized with respect to a given reference, the resulting signal differs from the actual reflective density of the document to thereby produce a deteriorated image.

Generally, data on shading produced when a uniformly white document is read is stored beforehand in memory. When a document is read actually, the values of the stored shading data are referred to and the read data is corrected as if there is no shading involved. However, great correction to the shading is actually difficult industrially due to the accuracy of A/D conversion performed by the correction circuit and limitation to the amplitude of an input voltage. The present invention is intended to eliminate such shading by providing an image sensor having a new structure.

The image sensor substrate assembly 100 includes a transparent substrate 101 which has thereon an electrode 102, a light screening film 102a, an insulating film 103, a photoelectric conversion film 104, an ohmic contact layer 105, an electrode 106, a protective film 107 and a light screening film 108 formed by photolithography so as take a predetermined pattern as are ICs formed. Thus, the read elements 2, storage capacitors 2a, reference elements 1 and read elements 3 are formed. The satin finish conductive film 13 includes a lamination of conductive transparent film 13a, intervening layer 13b and satin finish film 13c.

Figure 2:
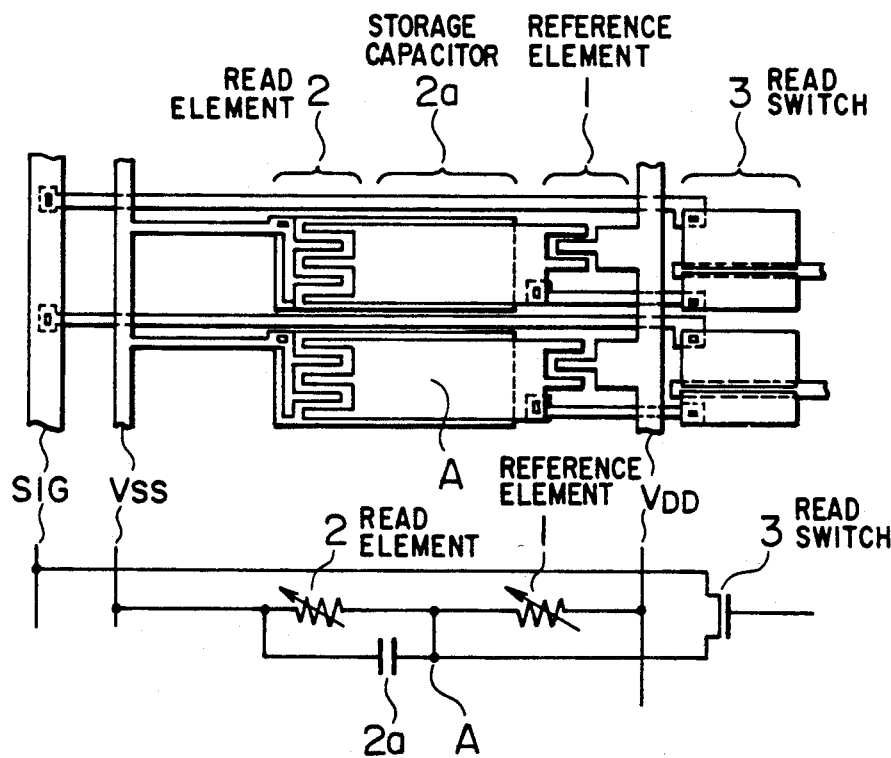
FIG. 2 illustrates a combination of a plan view of the sensor of FIG. 1 and a corresponding circuit diagram.

FIG. 2 is a combination of a plan view of the image sensor of the FIG. 1 embodiment and a circuit diagram corresponding to the plan view. The read and reference elements 2 and 1 each use a photoelectric conversion element and the read switch 3 includes a thin film FET. FIG. 2 omits light screening film 108, etc., for convenience of understanding.

The read element 2 is formed by the light screening film 102a so as not to receive light directly from the light source 14 and converts the light and supplied by the light source 14 and reflected by the document 11, to an electrical signal. The reference element 1 formed in the vicinity of the read element has no light screen film 102 and directly converts light from the light source 14 to an electrical signal. The screening film 108 provided over the reference element 1 screens the reflected light from the document. The electrical output from the read element 2 is proportional to the illuminance and reflectance of the document 11.

Since the photoelectric conversion output of the reference element 1 is proportional to the radiation intensity of the light source 14, the output is obtained which does not depend on variations in the luminance of the document or possible variations in the radiation intensity of the light source but depend on the reflectance of the document if the photoelectric conversion output of the read element 2 is corrected in accordance with the photoelectric conversion output of the reference element 1. In the present embodiment, arrangement is such that the reference element 1 is connected in series with the read element 2, the difference between constant applied voltages $V_{SS}$ and $V_{DD}$ is divided, and a read output signal appears as a voltage at the junction point of the elements 1 and 2. The read capacitor 2a is formed in parallel with the read element 2 to store a quantity of electric charges proportional to the difference between the voltage $V_{SIG}$ at the junction point A and $V_{SS}$ and the electrostatic capacitance C of the read capacitor 2a, $Q=C(V_{SIG}-V_{SS})$.

The read switch 3 is rendered conductive at predetermined read periods to transfer the electric charges to signal line SIG for reading purposes.

Figure 3:
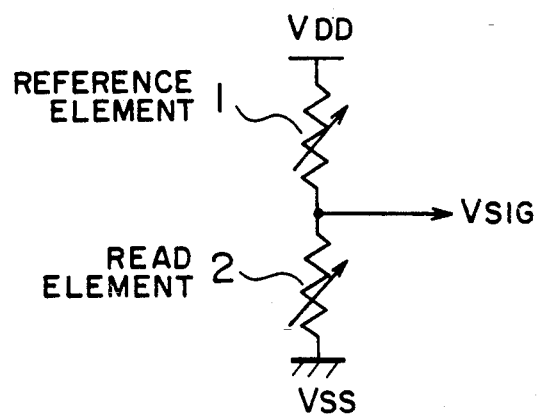
FIG. 3 is a partial enlarged view of the FIG. 2 embodiment circuit.

FIG. 3 shows the essential portion of the present embodiment. The voltage $V_{SIG}$ at the junction point is given by $$V_{SIG} = (V_{DD} - V_{SS})\frac{R_2}{R_1 + R_2}$$

where $R_2$ and $R_1$ are the resistance values of the read and reference elements 2, respectively. The conductance $\sigma_2$ of the read element is proportional to the radiation intensity I of the light source 14 and the reflectance $\gamma$ of the document while the conductance $\sigma_1$ of the reference element 1 is proportional to the radiation intensity of that of the light source 14. Thus, the signal voltage $V_{SIG}$ is given by $$V_{SIG} = (V_{DD} - V_{SS})\frac{1}{1 + \frac{\sigma_2}{\sigma_1}} = (V_{DD} - V_{SS})\frac{1}{1 + B\gamma} \quad (1)$$

where B is the ratio in conductance of the read and reference elements and designed depending on the layout of the elements and the light source and elements. The voltage $V_{SIG}$ depends not on a changing brightness of the light source 14 but on the reflectance of the document alone.

The output voltage is inversely proportional to the conductance ratio. Thus a change in the output voltage is reduced, whether B is large or small, and hence B should be an appropriate value.

Since the signal charge quantity Q is the output which depends on the signal voltage $V_{SIG}$ and the read capacitance C, a quantity of signal electric charges Q can be selected by changing the static capacity of the read capacitor. Thus, when the electric charges are transferred to the signal line SIG using the read switch including the thin film FET as in the present embodiment, a design may be made such that a read quantity of electric charges Q is changed according to the read rate required and the drive current capacity of the read switch 3. This differs greatly from the conventional image sensor which stores in the storage capacitance the overall photocurrent flowing through the read element which converts the reflected light from an original document to an electrical current. The structure of the read element which comprises the read element 2, reference element 1, and the read capacitor 2a greatly improves the performance of the image sensor and degree of freedom of circuit structure.

In the present embodiment, the read and reference elements are formed in the same photoelectric conversion film in the same process. Thus, provision of the read and reference elements; the two photoelectric conversion elements, does not increase the number of processes. Since the same film and process are used, the reference and read elements are influenced in common by variations in the materials used and variations the accuracy of patterns. Thus, the variations in the characteristics of the elements are reduced advantageously in the present embodiment which performs a read operation using the ratio in conductivity of the reference and read elements.

Provision of the read elements for converting the reflected light from an original document to an electrical signal and the read elements for converting direct light from the light source over the transparent substrate serves to correct shading due to variations in the brightness of light source used, thereby obtaining a signal indicative of the reflectance of the document. While in the present invention the read and reference elements each use a photo conductive type photoelectric conversion element, photo transistor type photoelectric conversion element, or layered type photoelectric conversion elements which operate as a photodiode may be used. While the photoelectric conversion outputs are voltages, currents and electric charges, any output proportional to a quantity of light entering the element may be used.

According to the present embodiment, a read signal free from shading due to variations in the brightness of the light source is obtained by taking the photoelectric conversion outputs from the junction point of the reference and read elements for receiving the illumining light and the reflected light from the document, respectively.

The simple structure in which the read and reference elements are connected in series and a portion of the voltage applied across the series connected read and reference elements is used as a read signal advantageously corrects shading due to variations in the brightness of the light source to provide an output voltage indicative of the reflectance of the document. While in the present embodiment the read and reference elements each include a photoconductive type photoelectric conversion element, layered type photodiodes or photo transistors may be used as a photoelectric conversion element for producing similar effects. Any of the reference and read elements may be used as a grounding side one.

Series connection of the read and reference elements and provision of the capacitance for transfer of a read quantity of electric charges in parallel with the read or reference element permit setting a quantity of electric charges for a read signal without depending on the magnitude of the photocurrent flowing through the read and reference elements, so that the quantity of electric charges for the signal corresponding to the drive capability of the read circuit is settable. Thus, the degree of freedom of design is improved.

Manufacturing the read and reference elements in the same process causes them to have the same varying patterns and them to have the same variations in the pattern and the same variations in the physical characteristic to thereby reduce those variations. These elements can be formed in the same process as thin film transistors. The formation of the read and reference elements in the same process permits high performance reading without increasing the number of manufacturing steps.

Figure 4:
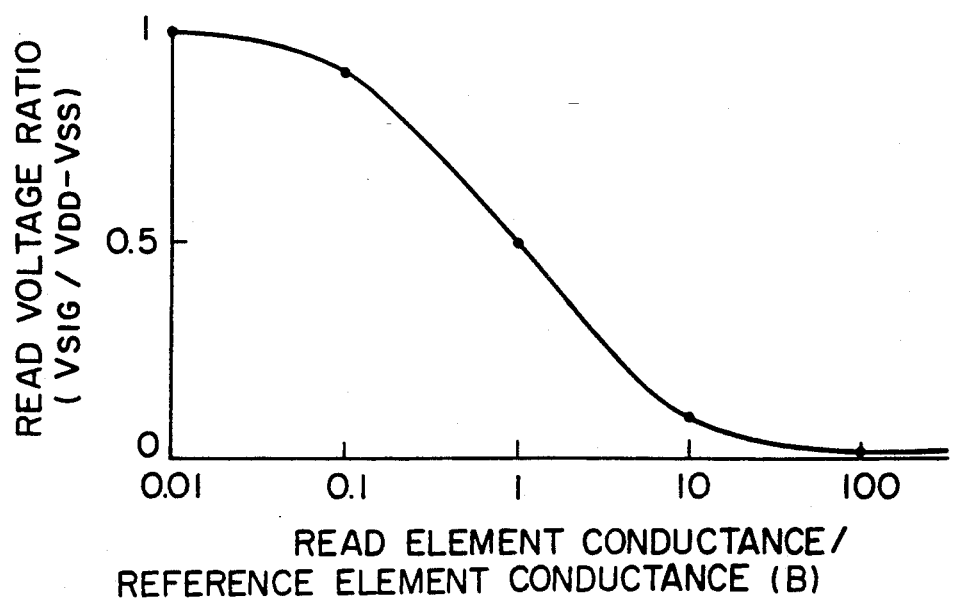
FIG. 4 is a characteristic diagram indicating the relationship between ratio in read output voltage of the sensor of the embodiment and the ratio in conductivity of the read to reference element.
Figure 5:
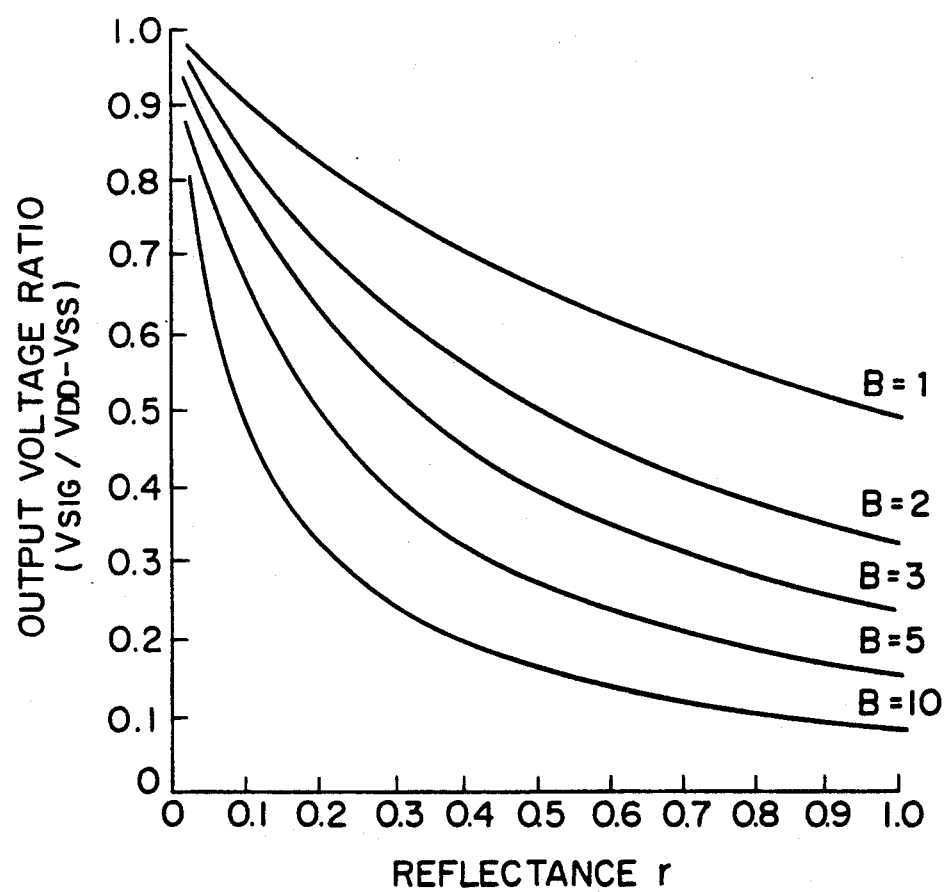
FIG. 5 is a characteristic diagram indicative of the relationship between output voltage ratio and reflectance.

The ratio in conductivity of the read to reference elements will be described with FIGS. 4 and 5. As described with respect to the embodiment of FIGS. 1 and 2, the read voltage depends on the ratio B in conductance of the read to reference elements when the reflectance is 1 (unity). The output voltage is saturated, whether B is larger or small, so that the error involved is large. Practically, setting B at about 10 provides a large voltage change while the better linearity is obtained at B=1. B is required to be set in a range of 0.1-100 or 0.5-5 according to purpose. The value of B is determined depending on the size and layout of the read and reference elements, and the positional relationship between those elements and the light source. B has a large degree of freedom of design. As described above, setting the ratio in photoconductance of the read to reference elements at 0.1-100 increases changes in the read voltage due to a change in the read voltage document reflectance to thereby improve the read accuracy.

Changes in the reflectance and output voltage are in substantially the linear relationship when B is small to thereby provide a signal of high quality.

For the minimum resolution, a read graph resolution or a voltage change per gradation is required to be higher than the noise level and depends on the noise level of the read sensor system.

Figure 6:
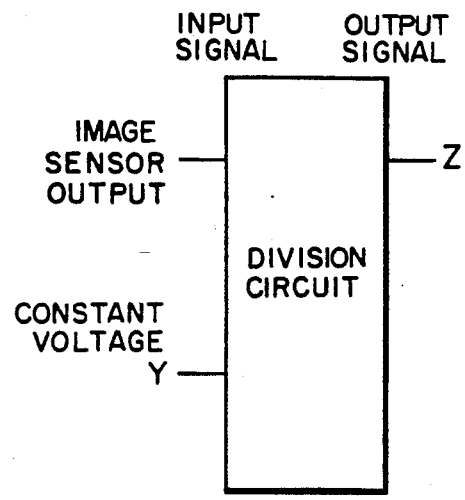
FIG. 6 is a block diagram of one example of the output circuit of the image sensor of the embodiment.

The read circuit of the read sensor described with respect to FIGS. 2-5 will be described with respect to FIGS. 6 and 7A, 7B. In the embodiment of FIGS. 2-5, the read voltage is represented by equation (1) including the ratio B in conductance of the read to reference elements. If the reflectance $\gamma$ changes, a read voltage $V_{SIG}$ appears which is substantially inversely proportional to reflectance $\gamma$. While the form of the signal varies depending on the read system, the output intensity is substantially in inverse proportion to the reflectance $\gamma$ when any of the voltage, current and quantity of electric charges is read. The nonlinearity is not a desirable characteristic to read and distinguish many individual gradations (intermediate color densities or gray scale). As shown in FIG. 6, a linear output Z is obtained by dividing a given voltage Y by the output X of the image sensor. Since the output X of the image sensor is not allowed to be 0, a resistor dividing circuit is required to be provided at the input to an operational amplifier 206, as shown in FIG. 7B.

In the embodiment of FIGS. 1 and 2, the output signal read represents a quantity of electric charges. The circuit comprising a current amplifier 201, an integrating circuit 202 and a dividing circuit 203 as shown in FIGS. 7A, 7B is preferable for high speed reading. When B is small, the linearity of signals is high, so that the dividing circuit 203 may be omitted.

Figure 7A:
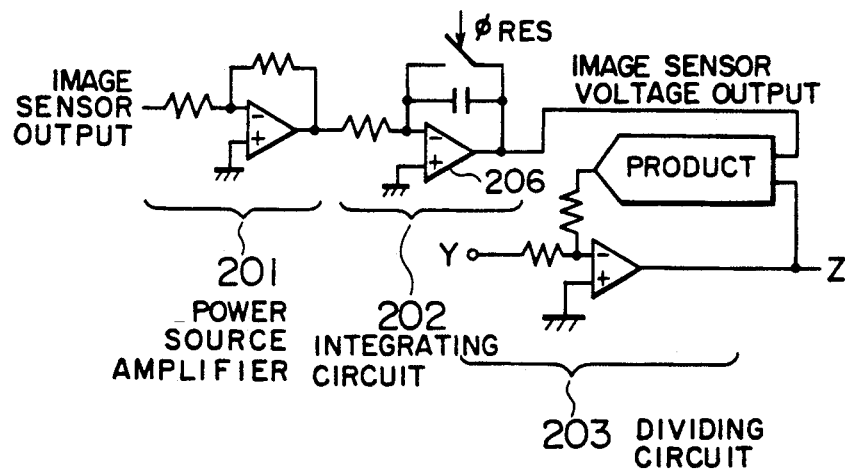
FIGS. 7A and 7B are circuit diagrams indicative of one example of the output circuit of the image sensor.
Figure 7B:
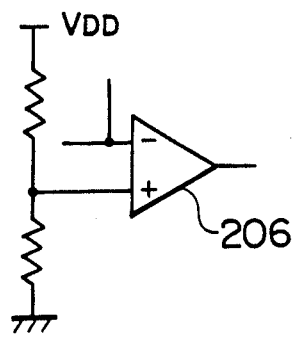

As illustrated with respect to the embodiment of FIGS. 7A, 7B, the dividing circuit provides a read output directly proportional to the reflectance or intensity of the reflected light when the series connected reference and read elements are used and the divided voltage signal is used as the read signal. Thus such structure is effective for reading an image of high quality such as reading gradations.

The embodiment of the present invention will be described using signal timing charts of FIGS. 8 and 9. The inventive image sensor includes a shift register unit 7, a buffer unit 6, dividing matrix lines 8, block switches 5, stabilizing switches 4, read transfer switches 3 those components being made of thin film amorphous silicon transistors; and a reference element 1 and read element 2, those components being made of a photoelectric conversion element.

Figure 8:
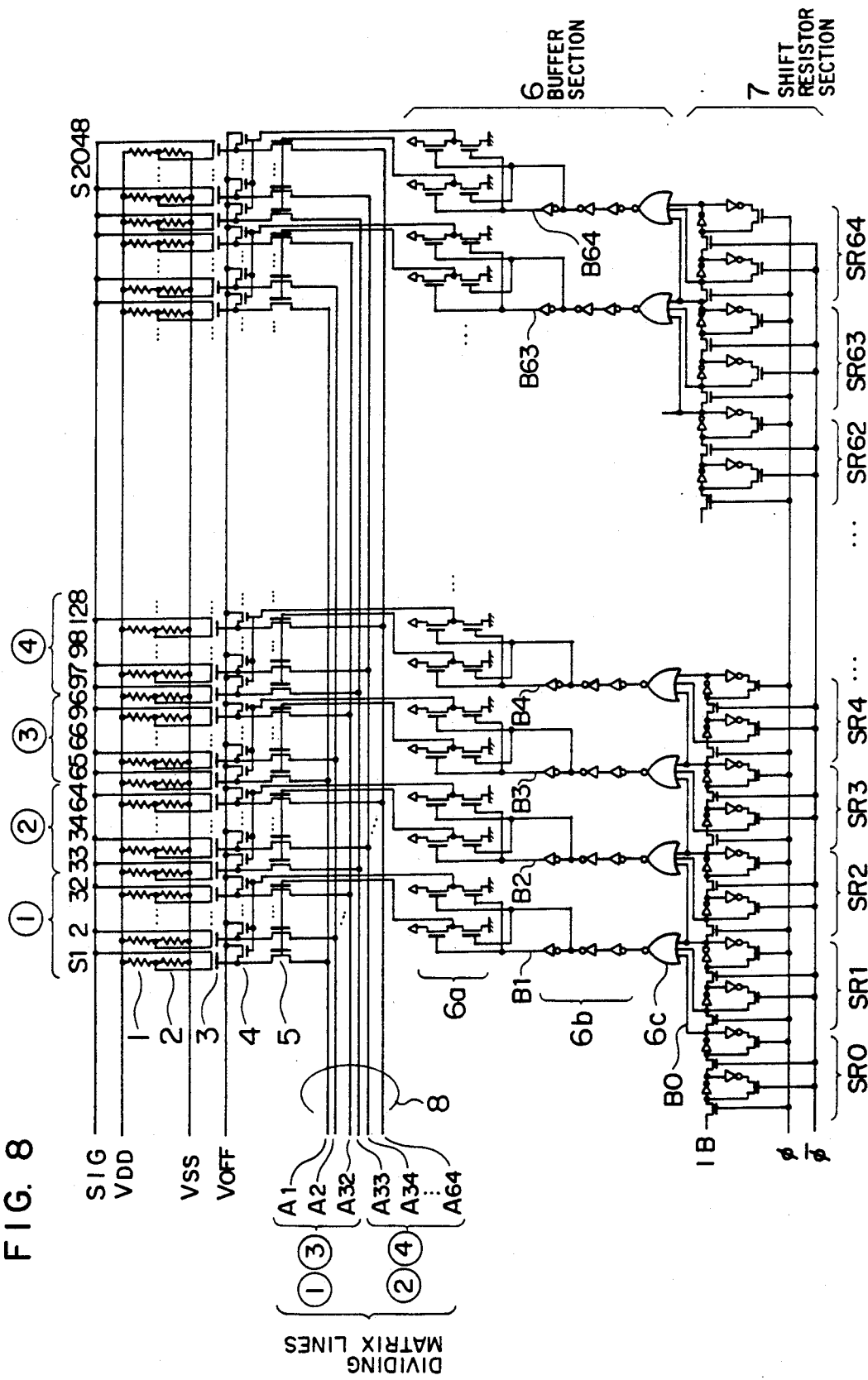
FIG. 8 is the entire circuit diagram of the image sensor according to the embodiment of the present invention.

The entire circuit of FIG. 8 is formed on a transparent substrate. There are read elements S1-S2048. FIG. 8 illustrates a G3 facsimile device. Some of the elements S1-S2048 are omitted or abbreviated using numerals. In the shift register, data is set at an input line IB and transferred sequentially from stages SR0 to SR64 in response to clock signals $\phi$ and $\bar\phi$. The signal drives a block switch 5 a stabilizing switch 4 which select the corresponding block of 32 elements and through the shift register 7 and buffers 6. Each buffer drives a push-pull circuit 6a through a NOR gate 6c and an inverter 6b for logic adjustment. In the meantime, the logical adjustment of signals and amplification of the drive current to cope with an increase in the switch size are performed. A pair of such push-pull circuits are provided for each block, one push-pull circuit being adapted to drive the gate electrodes of 32 block switches and the other push-pull circuit being adapted to operate in a logic reverse to that in which the former push-pull circuit to drive the block switches operates to thereby drive the gate lines of the stabilizing switches concerned.

If a block switch 5 is selected with data in the shift register 7 through the corresponding buffer and one of the dividing matrix lines is changed to 1 (positive logic), a read switch 3 is selected through a matrix of block switch 5 and matrix line 8 concerned. Thus, a quantity of electric charges read by the read element is transferred to the signal line. The read element includes the series connected read element 2 and reference element 1, as described above with respect to FIGS. 1 and 2 and has a read capacity (not shown) such as that shown by 2a in the FIG. 2 circuit.

Figure 9:
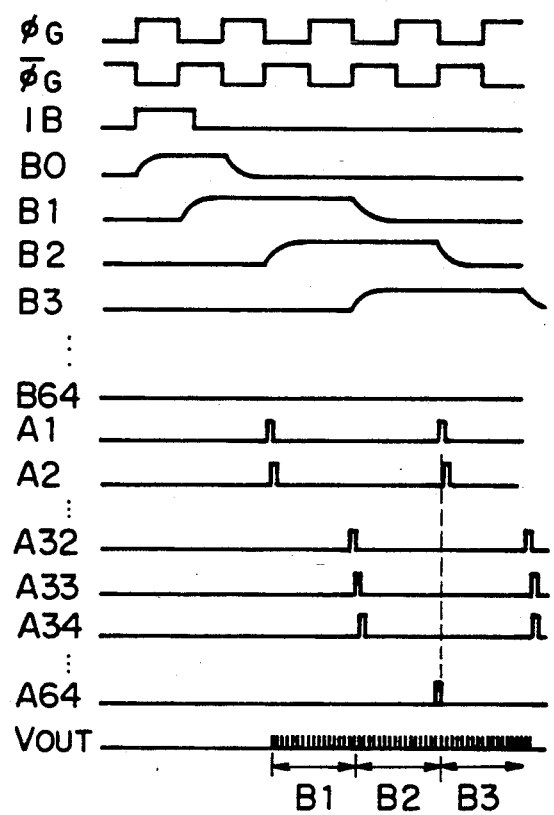
FIG. 9 is a signal timing chart for the circuit of FIG. 8.

The signal Vout of FIG. 9 is obtained by amplifying, integrating and dividing a signal on the signal line SIG using the circuit of FIGS. 7A, 7B. Here, only the intensity of the signal is shown. For such signal timing, the number of elements for one block is 32 and 64 blocks are required for driving 2,048 elements in the present embodiment in which the read elements are divided into blocks. There are 65 shift registers SR0–SR5 because a logic is used in which blocks in overlapped relationship are selected, and there are 64 dividing matrix lines A1–A65. In general division matrix driving, the matrix lines are the same in number as the elements of one block and thus the number of matrix lines in this case seems to be 32. If so, a rest interval is required to be provided between one block and the next block due to delayed operation in order to select the said block after the said one block. According to the present embodiment, an interval in which a new block is selected is increased by $t_R$ ($N_m - N_B$) where $t_R$ is a read time per element by increasing the number $N_m$ of dividing matrix lines 8 rather than the number $N_B$ of elements belonging to one block. In the embodiment of FIG. 8, $N_m = 2N_B$ and a continuous output without reset time intervals are obtained using a simple logic.

Figure 10:
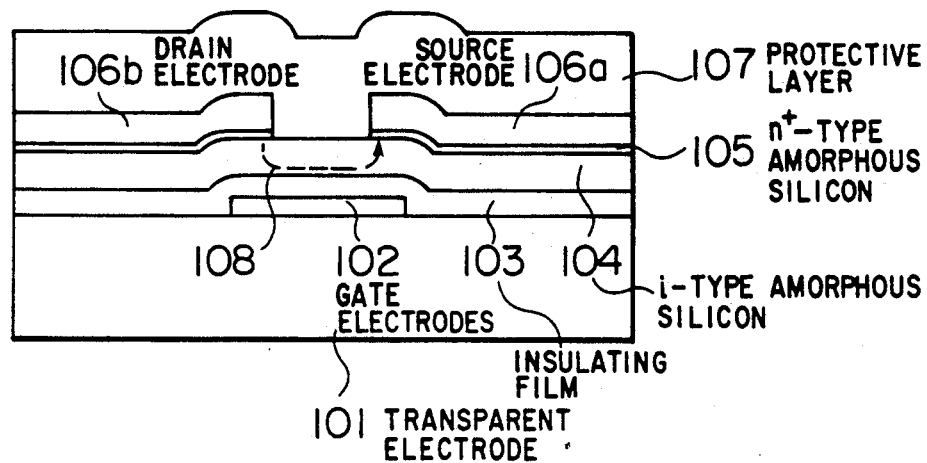
FIG. 10 is a cross sectional view of one embodiment of a thin film transistor applied to the present invention.

All the switches used in FIG. 8 may be composed of so-called reverse-staggered amorphous silicon thin-film transistors such as those shown in FIG. 10. Sequentially layered on the transparent substrate 101 and formed in predetermined patterns by photolithography are gate electrode 102, insulating film 103, i-type amorphous silicon layer 104, n+-type amorphous silicon film 105, source electrode 106a, drain electrode 106b and protective layer 107.

The thin film transistor switch having such structure is an n-channel MIS field effect transistor which operates following well the basic equation of a MOS transistor represented by the conductance $gm = W/L \, C_I \mu (V_G - V_T)$ where W is the channel width, L is the channel length. $C_I$ is the capacitance per area of the gate, $\mu$ is the drift mobility of electrons, and $V_T$ is the threshold voltage.

Since in such an amorphous silicon thin-film transistor the mobility of electrons $\mu$ is 0.1-1 cm$^2$/VS, namely, less than that in crystalline silicon by three order of magnitude, however, it is difficult for such transistor to drive a large current. In the embodiment of FIG. 8 where high speed operation by matrix driving, a decrease in the drive capacity, and selection of a read element capacity are performed, a 20 KHz shift register, 32 matrix lines per block and a synthetic operational rate of about 600 KHz are obtained, which rate is a sufficiently practical one at G3-standard facsimile devices. Since the read element and thin film transistors can be used in common, process is simplified, a quantity of wiring is reduced, and the substrate is miniaturized. Thus, an inexpensive high-performance image sensor is provided.

The basic inverter may be an E/R inverter, an E/E inverter or a CMOS inverter.

Figure 11:
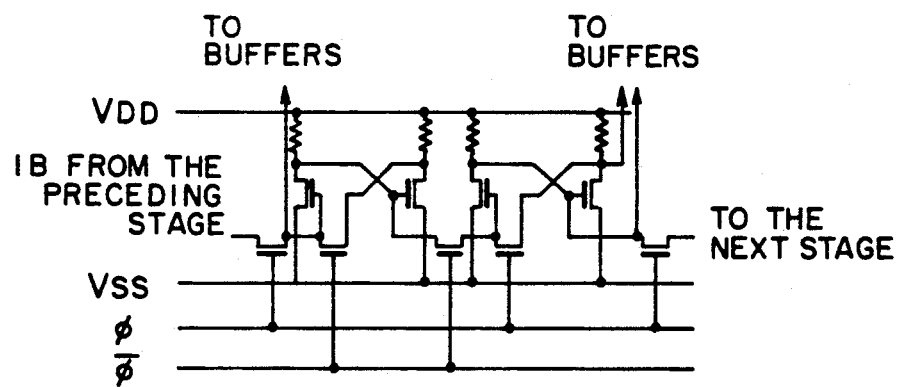
FIG. 11 is a cross sectional view of one embodiment of a shift register applied to the present invention.

FIG. 11 shows a shift register using an E/R inverter which is advantageously 6 times as rapid as an E/E inverter, but any one of them may be used.

According to the present embodiment, the small-capacity read element of FIGS. 1 and 2, the shift register unit, the buffer unit, the block switches, the stabilizing switches and the dividing matrix lines, each component being made of amorphous silicon thin-film transistors, serve to decrease the quantity of wiring and miniaturize the substrate. Thus, an inexpensive high-performance image sensor is provided.

In the present invention, the dividing matrix lines are larger in number than the elements of one block, so that sufficient time is given for block switching to thereby obtain a continuous read output.

The cross-sectional structure of the embodiment of the image sensor according to the present invention is already shown in FIG. 1. The operation of the circuit and elements is already described. Now, the embodiment of the satin-finish transparent conductive film will be described. The original document 11 is pressed by the platen roller 10 against the read element through the satin-finish film for predetermined reading, as mentioned above. At this time, the surface of the film is electrostatically charged due to the document being pressed. When the charged state of the film fluctuates (when the document moves), the ambient electrical field changes. Thus, without the film 11, noise would be induced in the leads of the read sensors and hence the thin film transistors would malfunction and the output of the image sensor would be abnormal. The satin-finish transparent conductive film includes a transparent conductive layer 13b comprising a transparent film base of polyester, acryl or the like and a transparent conductive layer of ITO (indium tin oxide) or tin oxide, and a satin-finished surface 13c.

ITO screens noise due to static electricity produced on the surface of the base film over which the document moves, and prevents the elements from producing abnormal outputs when no satin finish surface 13c is provided. More particularly, without the satin finish surface, the film is deformed by the pressing of the platen roller 10 to take the form of a concave mirror in the vicinity of the read element 2. Thus, if the film has no satin finish surface on the sensor side, light from the light source on the sensor surface side of the film is collected due to concave mirror effect to become an abnormally high output. The satin finish surface 13c is rough so that transmitted light and reflected light are scattered. Thus, light from the light source is scattered and stabilized reading is achieved even when the film is deformed.

The satin-finish transparent film may be formed by bonding a film with ITO on its one surface and a satin-finish film to each other such that the ITO surface and a non-satin finish surface are put in contact with each other.

Figure 12:
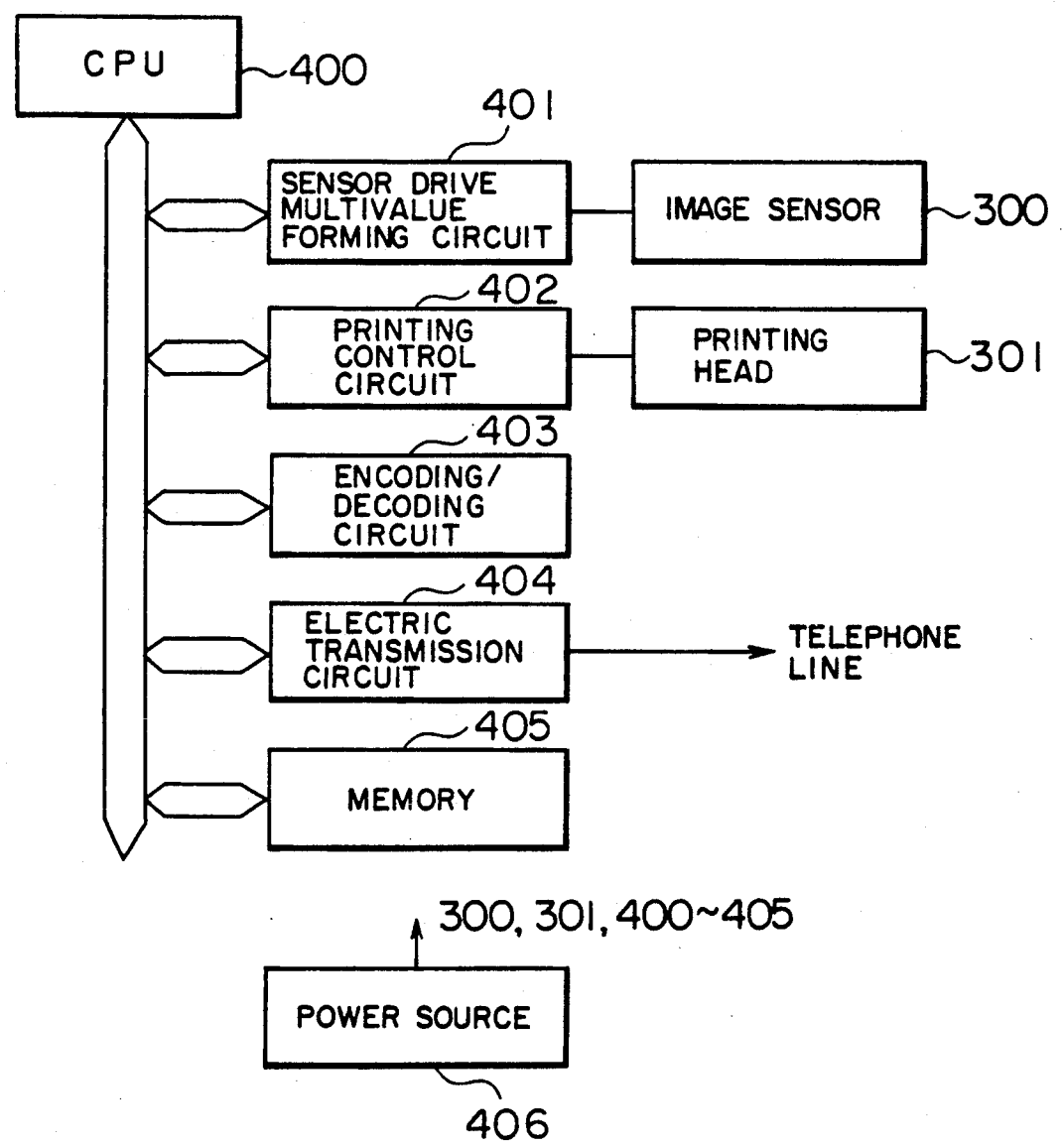
FIG. 12 is a block diagram of a contact sensor circuit.

FIG. 12 shows an illustrative circuit block using an image sensor according to the present invention. A CPU400 controls a sensor drive multivalue forming circuit 401, a recording control circuit 402, an encoding/decoding circuit 403, an electric transmission circuit 404 and a memory 405, through a bus line, using a control program stored in the memory 405. The multivalue forming circuit 401 is connected with the image sensor 100 while the printing control circuit 402 is connected with a printing head 301. The transmission circuit 404 is connected with a telephone line. A powder supply 406 supplies power to those circuit blocks.

In operation, the analog photoelectric conversion output read by image sensor 300 is converted to a multivalue digital signal such as a binary- or 16-gradation signal. When an original document is copied, such a digital signal is delivered to the printing control circuit and a hard copy is output by the printing head. When an original document is transmitted electrically, the digital signal output from the multivalue forming circuit 401 is delivered to the encoding/decoding circuit 305, where it is compressed and encoded, modulated by the transmission circuit 404 and sent to the telephone line.

A multivalue forming circuit having a simple structure is constructed by using an image sensor which includes an image sensor 2 and a reference element 1 like the embodiment of FIG. 1 because the read analog signal contains no shading distortions. More specifically, the generally used conventional sensor drive multivalue forming circuit is required to be designed such that a signal including shading distortions obtained when an original document is read is stored beforehand in memory and that shading distortions generated when an original document is actually read are corrected on the bases of the stored signal. A large amount of image data is required to be processed at high speed. Circuits which eliminate shading distortions are disclosed, for example, in Japanese Patent Publications JP-A 60-102063 and 60-94576. Those circuits require high speed processing and are large-scaled and hence required to be formed as an LSI circuit.

According to the present embodiment, a sensor drive multivalue forming circuit having a simple structure is constructed without requiring a shading correction circuit and a shading distortion storage memory. Thus, an inexpensive facsimile device is provided. Since no shading distortions are involved, a quantization error generated when the analog read signal is digitized is small and hence a high quality image is obtained.

Figure 13:
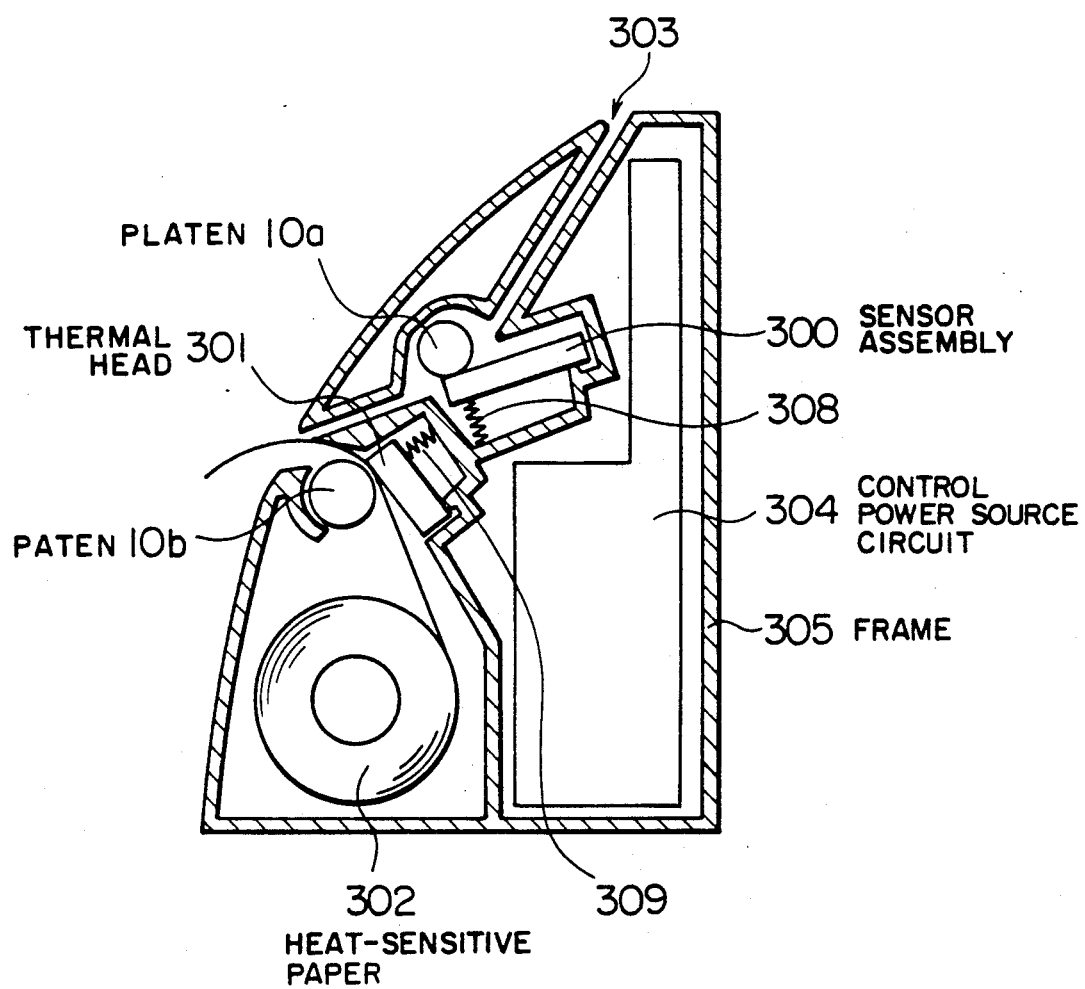
FIG. 13 is schematic cross-sectional view of a facsimile device to which the present invention is applied.

One example of a facsimile device in which the image sensor shown in FIGS. 1 and 8 is provided will be described with respect to FIG. 13 directed to a cross-sectional view of the device. FIG. 13 shows a read sensor assembly 300 according to the present invention, a platen roller 10, a thermal printing head 301, and heat sensitive paper 302. Other circuits, power supply, etc., are omitted. The image sensor assembly 300 has a cross-sectional structure shown in FIG. 1 and includes satin-finish transparent conductive film 13 and light source 14.

As shown, when an original document 303 is inserted into the facsimile device in the direction of arrow with the data recording surface thereof down, it is pressed against the image sensor assembly 300 through the platen roller 10a and press means 308 and read by a control power supply circuit 304, as mentioned above. The thermal head 301 presses the heat sensitive paper 302 against a heating element through platen roller 10b and press means 309 to obtain desired recorded paper on the basis of data from the control circuit 304. As just described, the layout of the components of the facsimile device is limited by a read system comprising the image sensor assembly 300 and platen roller 10a, and a recording system comprising the thermal head 301, platen roller 10b an heat sensitive paper 302. A compact design is achieved and the degree of freedom of design increases by using the image sensor according to the present invention, as shown in FIG. 13.

This cannot virtually achieved by a conventional CCD sensor which requires a reduction optical system used often. The CCD sensor requires the image surface of an original document to be imaged on a small sensor surface using the reduction optical system. Thus, the length of an optical path is required to be about 25 cm. After assembling, adjustment is required. Design is greatly restricted by the read system. In contrast, in the inventive contact type image sensor in which an original document is read in contact with the image sensor assembly, the length of the optical path is about 100 μm. Thus, great miniaturization is achieved and the degree of freedom of design increases. It will be understood that the actual dimensions of the housing or frame 305 are smaller than those shown.

According to the above embodiments, the read and reference elements formed over the transparent substrate convert light reflected by the original document and direct light from the light source to an electrical signal, so that shading due to variations in the brightness of the light source for the read elements is corrected with the outputs of the reference elements. Thus, a high performance contact type read sensor is provided which is corrects shading.

The simple structure in which the read and reference elements are connected in series and which a part of the voltage applied across the elements is used as a read signal corrects shading due to a varying luminous intensity of the light source.

According to the embodiment, since the read and reference elements are connected in series, and a capacitor is provided in parallel with the read or reference element, a quantity of electric charges for the signal determined by the product of the part of the voltage applied across the series connected elements and the read capacitance of the capacitor is set advantageously. Thus, the degree of freedom of design of the read circuit is greatly increased.

According to the present embodiment, since the read and reference elements are formed in the same process, high performance reading is achieved without increasing the number of processes used. Since they are formed in the same process, variations in the material and pattern accuracy of the read and reference elements are reduced and, as a result, reading is achieved with reduced variations.

If the ratios of conductances of the read and reference elements are set at a range of 0.1–100, a large change is obtained in the output voltage to thereby improve the read accuracy.

The output signal is linearized by the dividing circuit and reading high image quality including a halftone is achieved.

A shift register a buffer, a block switch, a stabilizing switch each component being made of amorphous silicon thin-film transistors and a dividing matrix line, are used to select a read switch to extract a signal form the read element concerned. Thus the number of leads is small and a small sensor is provided.

According to the present embodiment, the elements of one block are smaller in number than the dividing matrix lines, so that no rest interval is provided in block selection, the number of external circuits are small, and a continuous read output signal easy to use in a facsimile device is obtained.

Electrostatic charges will be generated due to friction between an original document and the conductive transparent film. Without the conductive transparent film, noise would be induced in the photoelectric conversion elements and circuit leads due to electrostatic charges and/or ambient electric waves to thereby render the output signal unstable. The presence of the conductive transparent film results in a stabilized output shielded from such induction.

Since the conductive transparent film is easily deformed by external forces, it is not broken, and is easily assembled and of high reliability.

The conductive transparent film may use a material such as polyester, nylon or acryl, transparent to light. Its conductivity is easily provided by coating a transparent conductive material such as ITO (indium tin oxide) or a thin metal film. Preferably, the sheet resistance is less than 100 k$\Omega/\square$.

Satin-finish matted processing of one surface of the conductive transparent film serves to prevent the generation of an abnormal output due to the light reflected by that surface, namely to provide a stabilized output signal. If the sensor substrate side surface of the film is smooth, the film would be deformed when an original document is pressed against the sensor to thereby cause the illumining light to be reflected by that surface and hence to easily enter the sensor elements. If so, light other than the light reflected by the document enters the sensor elements. Thus, the output signal becomes abnormal. Satin-finishing the film surface causes the illumining light reflected by the satin-finish surface to be scattered, so that a stabilized output signal is obtained. If the surface, processed so, of the film is dirty, it can be easily replaced to thereby ensure maintenance.

By provision of the satin-finish transparent conductive film over the image sensor, the thin film transistors do not malfunction, no electrical or chemical noise is involved in the read signal and hence high quality reading is achieved. Contact reading serves to miniaturize facsimile devices and increases the degree of freedom of designing the facsimile devices.

What is claimed is:

1. A contact type image sensor comprising:
   a transparent substrate;
   a plurality of photoelectric conversion elements disposed over the substrate, each photoelectric conversion element including a first photoelectric conversion element and a second photoelectric conversion element in adjacent relationship to the first photoelectric conversion element; and
   an opaque film disposed over a part of the plurality of photoelectric conversion elements so as to be disposed over the first photoelectric conversion element without being disposed over the second photoelectric conversion element.

2. A contact type image sensor according to claim 1, including a transparent conductive resin film deposited over the transparent substrate so as to cover the plurality of photoelectric conversion elements.

3. A contact type image sensor according to claim 1, including a transparent conductive resin film deposited over the transparent substrate so as to cover the plurality of photoelectric conversion elements, that surface of the film facing the elements being rough at least in the vicinity of the elements.

4. A contact type image sensor according to claim 1, including a transparent laminate layer deposited over the transparent substrate so as to cover the plurality of photoelectric conversion elements, that surface of the laminate layer facing the elements being rough at least in the vicinity of the elements.

5. A contact type image sensor according to claim 1, including a transparent conductive resin film deposited over the transparent substrate so as to cover the plurality photoelectric conversion elements, that surface of the film facing the elements including in the vicinity of the elements at least a surface portion for scattering light incident thereon.

6. A contact type image sensor according to claim 1, including a transparent resin film deposited over the transparent substrate so as to cover the plurality of photoelectric conversion elements, that surface of the film facing the elements including in the vicinity of the elements at least a surface portion for scattering light incident thereon.

7. A contact type image sensor according to claim 6, wherein the plurality of photoelectric conversion elements are provided in the vicinity of a transparent portion of the substrate, and the sensor comprising a transparent laminate disposed for covering the plurality of elements in an adhesive-free manner.

8. A contact type image sensor assembly comprising a contact type image sensor according to claim 6, the transparent substrate including an incident light path provided on the back thereof, and a platen roller abutting a surface of the film or transparent layer through printing paper in the vicinity of the plurality of photoelectric conversion elements.

9. A contact type image sensor assembly according to claim 8, including a light source provided in a base on which the substrate is provided for ensuring an optical path.

10. A facsimile device comprising in a housing an image sensor assembly according to claim 9 and a printing unit comprising a thermal head and a printing paper roller.

11. A contact type image sensor according to claim 1, wherein the
    second photoelectric conversion element is connected with the first photoelectric conversion element.

12. A contact type image sensor according to claim 1, further including:
    a pair of electrodes disposed at positions where they hold a photoelectric conversion film of the second photoelectric conversion element therebetween, that electrode of the pair remote from the substrate facing a part of the other electrode.

13. A contact type image sensor comprising:
    a transparent substrate;
    a first light screening film disposed on a part of the substrate; and
    a plurality of photoelectric conversion elements disposed over the light screening film and over the substrate where no light screening film is disposed, each photoelectric conversion element including a first photoelectric conversion element disposed over the light screening film and a second photoelectric conversion element disposed over the substrate where no light screening film is disposed.

14. A contact type image sensor according to claim 13, including a transparent conductive resin film deposited over the transparent substrate so as to cover the photoelectric conversion elements.

15. A contact type image sensor according to claim 13, including a transparent conductive resin film deposited over the transparent substrate so as to cover the plurality of photoelectric conversion elements, that surface of the film facing the elements being rough at least in the vicinity of the elements.

16. A contact type image sensor according to claim 13, including a transparent laminate layer deposited over the transparent substrate so as to cover the plurality of photoelectric conversion elements, that surface of the laminate layer facing the elements being rather rough at least in the vicinity of the elements.

17. A contact type image sensor according to claim 13, including a transparent conductive resin film deposited over the transparent substrate so as to cover the plurality of photoelectric conversion elements, that surface of the film facing the elements including in the vicinity of the elements at least a surface portion for scattering light incident thereon.

18. A contact type image sensor according to claim 13, including a transparent resin film deposited over the transparent substrate so as to cover plurality of photoelectric conversion elements, that surface of the film facing the elements including in the vicinity of the elements at least a surface portion for scattering light incident thereon.

19. A contact type image sensor according to claim 18, wherein the plurality of photoelectric conversion elements are provided in the vicinity of a transparent portion of the substrate, and further comprising a transparent laminate disposed for covering the plurality of elements in an adhesive-free manner.

20. A contact type image sensor assembly comprising a contact type image sensor according to claim 18, the transparent substrate including an incident light path provided on the back thereof, a platen roller abutting a surface of the film or transparent layer through printing paper in the vicinity of the photoelectric conversion elements.

21. A contact type image sensor assembly according to claim 20, including a light source provided in a base on which the substrate is provided for ensuring an optical path.

22. A facsimile device comprising in a housing an image sensor assembly according to claim 21 and a printing unit comprising a thermal head and a printing paper roller.

23. A contact type image sensor comprising:
a transparent substrate;
a plurality of photoelectric conversion elements disposed over the transparent substrate, each photoelectric conversion element being disposed on the opposite side of the substrate from an optical source;
each photoelectric conversion element including a reference element for converting direct light from a light source to an electrical signal and a read element for converting light from an original document to an electrical signal.

24. A contact type image sensor according to claim 23, including a transparent conductive resin film deposited over the transparent substrate so as to cover the plurality of photoelectric conversion elements.

25. A contact type image sensor according to claim 23, including a transparent conductive resin film deposited over the transparent substrate so as to cover the plurality of photoelectric conversion elements, that surface of the film facing the elements being rather rough at least in the vicinity of the elements.

26. A contact type image sensor according to claim 23, including a transparent laminate layer deposited over the transparent substrate so as to cover the plurality photoelectric conversion elements, that surface of the laminate layer facing the elements being rough at least in the vicinity of the elements.

27. A contact type image sensor according to claim 23, including a transparent conductive resin film deposited over the transparent substrate so as to cover the plurality of photoelectric conversion elements, that surface of the film facing the elements including in the vicinity of the elements at least a surface portion for scattering light incident thereon.

28. A contact type image sensor according to claim 23, including a transparent resin film deposited over the transparent substrate so as to cover the plurality of photoelectric conversion elements, that surface of the film facing the elements including in the vicinity of the elements at least a surface portion for scattering light incident thereon.

29. A contact type image sensor according to claim 28, wherein the plurality of photoelectric conversion elements are provided in the vicinity of a transparent portion of the substrate, and further comprising a transparent laminate disposed for covering the plurality of elements in an adhesive-free manner.

30. A contact type image sensor assembly comprising a contact type image sensor according to claim 28, the transparent substrate including an incident light path provided on the back thereof, and a platen roller abutting a surface of the film or transparent layer through printing paper in the vicinity of the photoelectric conversion elements.

31. A contact type image sensor assembly according to claim 30 including a light source provided in a base on which the substrate is provided for ensuring an optical path.

32. A facsimile device comprising in a housing an image sensor assembly according to claim 31 and a printing unit comprising a thermal head and a printing paper roller.

33. A contact type image sensor according to claim 23 wherein the read and reference elements are connected in series.

34. A contact type image sensor according to claim 33, including a capacitor provided in parallel with the read element.

35. A contact type image sensor according to claim 33, including a capacitor provided in parallel with the reference element.

36. A contact type image sensor according to claim 33, wherein the read and reference elements are formed in the same level over the transparent substrate.

37. A contact type image sensor according to claim 33, wherein the ratio of conductance in the read element to the conductance in the reference element is 0.1–100.

38. A contact type image sensor according to claim 33, further including a dividing circuit for linearizing output read signal.

39. A contact type image sensor according to claim 33, further comprising:
a plurality of read switches of thin film transistors for selecting a read signal.

40. A contact type image sensor according to claim 39, including a transparent conductive resin film deposited over the transparent substrate so as to cover the plurality of photoelectric conversion elements.

41. A contact type image sensor according to claim 39, including a transparent conductive resin film deposited over the transparent substrate so as to cover the plurality of photoelectric conversion elements, that surface of the film facing the elements being rough at least in the vicinity of the elements.

42. A contact type image sensor according to claim 39, including a transparent laminate layer deposited over the transparent substrate so as to cover the plurality of photoelectric conversion elements, that surface of the laminate layer facing the elements being rough at least in the vicinity of the elements.

43. A contact type image sensor according to claim 39, including a transparent conductive resin film deposited over the transparent substrate so as to cover the plurality of photoelectric conversion elements, that surface of the film facing the elements including in the vicinity of the elements at least a surface portion for scattering light incident thereon.

44. A contact type image sensor according to claim 39, including a transparent resin film deposited over the transparent substrate so as to cover the plurality photoelectric conversion elements, that surface of the film facing the elements including in the vicinity of the elements at least a surface portion for scattering light incident thereon.

45. A contact type image sensor according to claim 44, wherein the plurality of photoelectric conversion elements are provided in the vicinity of a transparent portion of the substrate, and further comprising a transparent laminate disposed for covering the plurality of elements in an adhesive-free manner.

46. A contact type image sensor assembly comprising a contact type image sensor according to claim 44, the transparent substrate including an incident light path provided on the back thereof, and a platen roller abutting a surface of the film or transparent layer through printing paper in the vicinity of the photoelectric conversion elements.

47. A contact type image sensor assembly according to claim 46, including a light source provided in a base on which the substrate is provided for ensuring an optical path.

48. A facsimile device comprising in a housing an image sensor assembly according to claim 47 and a printing unit comprising a thermal head and a printing paper roller.

49. A facsimile device comprising a contact type image sensor, comprising:
    a sensor assembly for reading an image on an original document inserted;
    a first platen for feeding the original document inserted by rotation;
    means for pressing the sensor assembly against the first platen such that the document is brought into contact with the sensor assembly;
    printing means;
    a roller for holding printing paper on which data received by the printing means is printed;
    a second platen for carrying the printing paper by rotation;
    means for pressing the printing means against the second platen such that the printing paper is brought into contact with the printing means;
    a control circuit connected with the sensor assembly and the printing means for controlling reading an image on the document and printing onto the printing paper; and
    the sensor assembly including a pair of photoelectric conversion elements connected with each other, one of the photoelectric conversion elements having an opaque film disposed thereover, the output indicative of data on the read image on the document being extracted from a connection point of the pair of photoelectric conversion elements.

50. A contact type image sensor according to claim 23, wherein the read element converts light from the light source reflected from the original document.

* * * * *